F. HENZELMANN.
BALL BEARING.
APPLICATION FILED OCT. 23, 1908.

929,426.

Patented July 27, 1909.

WITNESSES:

INVENTOR
Fritz Henzelmann
BY
ATTORNEY

UNITED STATES PATENT OFFICE.

FRITZ HENZELMANN, OF CHICAGO, ILLINOIS.

BALL-BEARING.

No. 929,426.　　　Specification of Letters Patent.　　　Patented July 27, 1909.

Application filed October 23, 1908. Serial No. 459,161.

*To all whom it may concern:*

Be it known that I, FRITZ HENZELMANN, a subject of the Emperor of Germany, and residing at Chicago, in the county of Cook and State of Illinois, have invented a new and useful Improvement in Ball-Bearings, of which the following is a complete specification.

This invention relates to improvements in ball bearings and more particularly to a ball bearing in which the friction between the balls and their support or carrier is reduced to a minimum.

In many places where ball bearings are employed it is necessary to provide a carrier for the balls to hold them between the bearing surfaces, and in order to procure the best results from the bearing it is necessary that the friction between the bearing balls and the carrier be reduced to a minimum.

The object of this invention is to provide a ball bearing of that class in which the bearing balls are supported in a carrier or housing so constructed that the bearing as a whole may be removed from the place where it is employed or be inserted therein without the inconvenience of handling the individual balls.

It is also an object of the invention to provide a ball bearing in which the friction between the bearing balls and their carrier is reduced to a minimum so that the balls are free to move under the influence of the surfaces which they separate.

It is a further object of the invention to provide a very cheap and simple construction adapted to prevent the accumulation of dirt therein should any find access thereto while in use.

The invention consists of the matters hereinafter described in the specification and more fully pointed out and defined in the appended claims.

Figure 1:
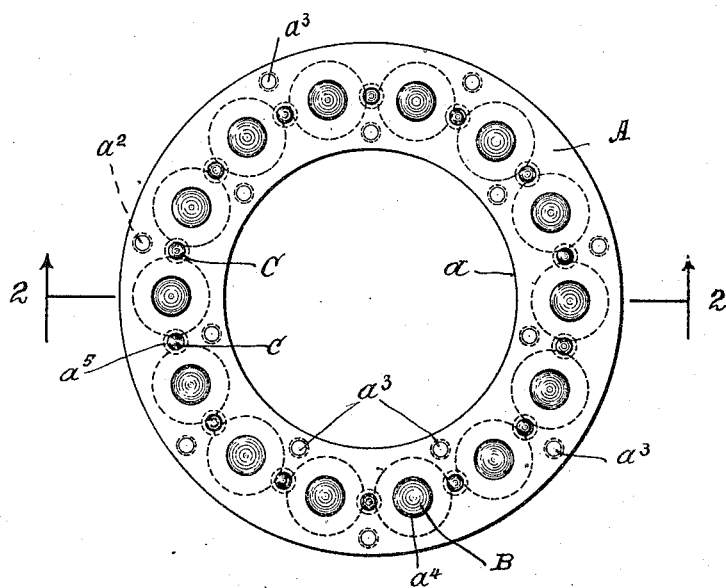
Figure 2:
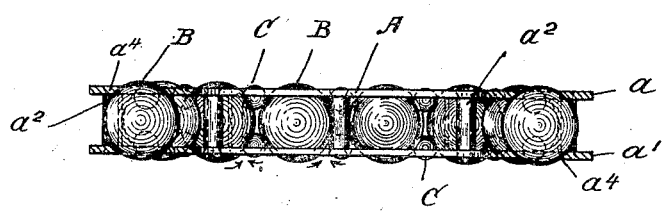

In the drawings: Figure 1 is a side elevation of a device embodying my invention. Fig. 2 is a section taken on line 2—2 of Fig. 1.

As shown in said drawings: A indicates the carrier as a whole which comprises two plates $a$ and $a'$ lying in parallel planes and which are held in proper relation to each other by means of a plurality of sleeves $a^2$ between the plates and against the ends of which said plates rest, and a plurality of studs $a^3$, one of which extends through each sleeve and through each plate and has its ends riveted down to hold the plates in place. Of course if preferred said studs may be screwed or otherwise secured in the plates to permit their removal. Said plates may be of any preferred form dependent upon the place where the bearing is to be employed, but as shown herein they are annular and adapted to be placed upon a shaft or axle. In each plate there are a plurality of registering apertures or seats $a^4$ which are of larger circumference on the inner faces of the plates than on the outer faces thereof, as shown more clearly in Fig. 2, so as to provide seats for the bearing balls B which lie between said plates and project through said apertures beyond the plates a sufficient distance to hold the surfaces for which they afford a bearing out of contact with the plates.

Intermediate the bearing seats $a^4$ in each plate are bearing seats $a^5$ similar to the seats $a^4$ but of much less diameter, and seated in each seat $a^5$ of each plate is a spacing ball C of sufficient size to contact with each of the adjacent bearing balls, but which does not protrude through the plate as far as the balls B.

In operation the carrier with the bearing and spacing balls assembled therein as before described is placed between the surfaces or parts for which it is desired to provide an anti-friction bearing. The bearing balls B project sufficiently beyond the plates $a$—$a'$ to receive said surfaces or parts thereon and to prevent the spacing balls C from coming in contact therewith. Inasmuch as the spacing balls contact with the bearing balls and are located in the line of travel of said bearing balls it is evident that they will take the wear that would ordinarily fall upon the seats $a^4$ and thereby greatly reduce the friction between the bearing balls and the plates $a$—$a'$. Obviously a bearing constructed in accordance with my invention is adapted to greatly reduce the internal friction of the bearing, and obviously also many details of form and construction may be varied without departing from the principles of my invention.

I claim as my invention:

1. In a device of the class described the combination with a carrier having oppositely disposed bearing seats therein, bearing balls engaged in said seats, and projecting through the sides of the carrier, and spacing balls supported in each side of said carrier intermediate said seats.

2. In a device of the class described the combination with a carrier having a plurality of oppositely disposed bearing seats therein, of bearing balls in said seats and projecting through the sides of the carrier, and a pair of spacing balls supported in said carrier between each two adjacent bearing balls.

3. In a device of the class described the combination with a pair of plates having registering bearing seats therein, of means adapted to secure said plates together, a plurality of bearing balls intermediate said plates and seated in said seats, and a pair of spacing balls intermediate each two adjacent bearing balls and adapted to take the thrust thereof.

4. In a device of the class described the combination with a pair of plates, each having a plurality of bearing seats therein, means adapted to hold said plates in parallel relation a distance apart, a plurality of bearing balls engaged in said seats and projecting through said plates, and a spacing ball in each plate between each two adjacent bearing balls.

5. In a device of the class described the combination with a pair of annular plates having oppositely disposed bearing seats therein, bearing balls engaged in said seats, means adapted to secure said plates to said balls, and a plurality of spacing balls carried in each plate and each adapted to contact with two of said bearing balls and reduce the friction between the same and said plates.

6. In a device of the class described the combination with a pair of annular plates having bearing seats therethrough, arranged equal distances apart and at equal distances from the axes of the plates, means adapted to engage said plates together, bearing balls between said plates and seated in said seats, and a plurality of spacing balls in each plate supported in the line of travel of said bearing balls and adapted to reduce the friction between the balls and plates.

In testimony whereof I have hereunto subscribed my name in the presence of two witnesses.

FRITZ HENZELMANN.

Witnesses:
ROBT. KLOTZ,
JOE MILLER.